United States Patent
Pan et al.

(10) Patent No.: US 11,625,539 B2
(45) Date of Patent: Apr. 11, 2023

(54) EXTRACTING TRIGGER WORDS AND ARGUMENTS FROM TEXT TO OBTAIN AN EVENT EXTRACTION RESULT

(71) Applicant: BEIJING BAIDU NETCOM SCIENCE AND TECHNOLOGY CO., LTD., Beijing (CN)

(72) Inventors: Lu Pan, Beijing (CN); Yuguang Chen, Beijing (CN); Fayuan Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 253 days.

(21) Appl. No.: 17/113,748

(22) Filed: Dec. 7, 2020

(65) Prior Publication Data
US 2021/0406476 A1 Dec. 30, 2021

(51) Int. Cl.
| | |
|---|---|
| *G06F 40/279* | (2020.01) |
| *G06F 40/30* | (2020.01) |
| *G06N 3/045* | (2023.01) |
| *G06F 40/284* | (2020.01) |
| *G06F 40/289* | (2020.01) |

(52) U.S. Cl.
CPC ............ *G06F 40/30* (2020.01); *G06F 40/284* (2020.01); *G06F 40/289* (2020.01)

(58) Field of Classification Search
CPC .... G06F 40/279; G06F 40/284; G06F 40/289; G06F 40/30; G06N 20/00; G06N 3/045
USPC ...................................... 704/1, 9; 706/12, 20
See application file for complete search history.

(56) References Cited

U.S. PATENT DOCUMENTS

| | | | | |
|---|---|---|---|---|
| 8,606,564 | B2* | 12/2013 | Merugu ................ | G06F 40/284 704/9 |
| 9,812,028 | B1* | 11/2017 | Elchik ................... | G06F 40/279 |
| 11,144,721 | B2* | 10/2021 | Deshmukh ............ | G06F 40/284 |
| 2012/0036130 | A1* | 2/2012 | Light .................... | G06F 40/295 707/769 |
| 2018/0061256 | A1* | 3/2018 | Elchik ................... | G06F 40/279 |
| 2018/0336272 | A1* | 11/2018 | Garcia Santa .......... | G06F 40/30 |
| 2018/0349355 | A1* | 12/2018 | Shi ........................ | G06F 40/289 |
| 2020/0202211 | A1* | 6/2020 | Indenbom ............. | G06F 40/284 |
| 2021/0209416 | A1* | 7/2021 | Han ....................... | G06N 5/022 |
| 2021/0342371 | A1* | 11/2021 | Han ....................... | G06F 40/216 |
| 2021/0365306 | A1* | 11/2021 | Haidar ................... | G06F 40/30 |
| 2021/0374347 | A1* | 12/2021 | Yang ..................... | G06F 40/284 |

FOREIGN PATENT DOCUMENTS

| | | |
|---|---|---|
| JP | 2019212292 A | 12/2019 |
| KR | 101646159 B1 | 8/2016 |

OTHER PUBLICATIONS

Xu et al., "Chinese Event Detection Based on Multi-Feature Fusion and BiLSTM", IEEE Access, vol. 7, Sep. 30, 2019, pp. 134992-135004. (Year: 2019).*

(Continued)

*Primary Examiner* — Martin Lerner
(74) *Attorney, Agent, or Firm* — Lippes Mathias LLP

(57) ABSTRACT

A method for extracting an event from a text including obtaining an input text; inputting the input text into a model for extracting trigger words to obtain a trigger word extraction result of the input text; inputting the input text and the trigger word extraction result into a model for extracting arguments to obtain an argument extraction result of the input text; and obtaining an event extraction result of the input text according to the trigger word extraction result and the argument extraction result.

14 Claims, 8 Drawing Sheets

(56) References Cited

OTHER PUBLICATIONS

Zhang et al., "Context-aware Event Type Identification Based on Context Fusion and Joint Learning", 2020 IEEE Fifth International Conference on Science in Cyberspace, Aug. 24, 2020, pp. 105-112. (Year: 2020).*

Xiaoming et al., "Chinese Complex Question Analysis Based on Event Extraction", 2020 International Conference on Computer Application and System Modeling (ICCASM 2010), Oct. 22-24, 2010, pp. V8-667-V8-670. (Year: 2010).*

Majumder et al., "Machine Learning Approach to Argument Extraction of Bio-molecular Events", 2012 National Conference on Computing and Communications Systems (NCCCS), Nov. 21-22, 2012, pp. 1-5. (Year: 2012).*

Majumder et al., "Feature Selection for Event Extraction in Biomedical Text", 2015 Eighth International Conference on Advances in Pattern Recognition (ICAPR), Jan. 4-7, 2015, pp. 1-6. (Year: 2015).*

Office Action for Japanese Application No. 2020-217680, dated Mar. 8, 2022, 4 pages.

Offce Action for Korean Application No. 10-2020-0183500, dated Jan. 28, 2022, 6 pages.

Yee Seng Chan et al., "Rapid Customization for Even Extraction", Raytheon BBN Technologies, Sep. 20, 2018, 7 pages.

Extended European Search Report for Application No. 20213084.5, dated Jun. 2, 2021, 8 pages.

Zhengyan Zhang et al., "ERNIE: Enhanced Language Representation with Informative Entities", Department of Computer Science and Technology, Tsinghua University, Beijing, China, Jun. 4, 2019, 11 pages.

Libin Hou et al., "Event Argument Extraction Based on CRF", Springer-Verlag Berlin Heidelberg, Jul. 6, 2012, 8 pages.

David Ahn, "The Stages of Event Extraction", Association for Computational Linguistics, Proceedings of the Workshop on Annotating and Reasoning about Time and Events, pp. 1-8, Sydney, Jul. 23, 2006.

* cited by examiner

EXTRACTING TRIGGER WORDS AND ARGUMENTS FROM TEXT TO OBTAIN AN EVENT EXTRACTION RESULT

CROSS-REFERENCE TO RELATED APPLICATION

This application is based upon and claims priority to Chinese Patent Application No. 202010608577.6, filed on Jun. 30, 2020, the entire contents of which are incorporated herein by reference.

TECHNICAL FIELD

The disclosure relates to the field of artificial intelligence technologies, especially to fields of knowledge graph, deep learning, and natural language processing, and more particular to, a method for extracting an event from a text, an apparatus for extracting an event from a text, an electronic device, and a storage medium.

BACKGROUND

With popularization and development of the Internet, scale of information in the Internet is significantly increasing, and it has become increasingly urgent to find certain information in a timely and accurate manner from massive natural language texts. Information Extraction (IE) extracts information of specified types of entities, relationships and events from loose and unstructured ordinary texts, and outputs structured data. Event Extraction is one of the most challenging tasks in IE, which mainly studies the mode of extracting basic information on events from unstructured natural language texts, such as event types and event participants, and time and place of occurrence, and presents the information in a structured form. Therefore, how to extract events accurately and quickly from a text is a technical problem that needs to be solved urgently.

SUMMARY

In a first aspect, embodiments of the disclosure provide a method for extracting an event from a text. The method includes: obtaining an input text; inputting the input text into a model for extracting trigger words to obtain a trigger word extraction result of the input text; inputting the input text and the trigger word extraction result into a model for extracting arguments to obtain an argument extraction result of the input text; and obtaining an event extraction result of the input text according to the trigger word extraction result and the argument extraction result.

In a second aspect, embodiments of the disclosure provide an electronic device. The electronic device includes: at least one processor, and a memory communicatively connected to the at least one processor. The memory stores instructions executable by the at least one processor, and when the instructions are executed by the at least one processor, the at least one processor is caused to implement the method for extracting the event from the text according to the disclosure.

In a third aspect, embodiments of the disclosure provide a non-transitory computer-readable storage medium storing computer instructions. The computer instructions are used to cause the computer to implement the method for extracting the event from the text according to the disclosure.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The accompanying drawings are used to better understand the solution, and do not constitute a limitation on the application, in which.

DETAILED DESCRIPTION

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

A method for extracting an event from a text, an apparatus for extracting an event from a text, an electronic device, and a storage medium according to embodiments of the disclosure may be described below with reference to the accompany drawings.

Figure 1:
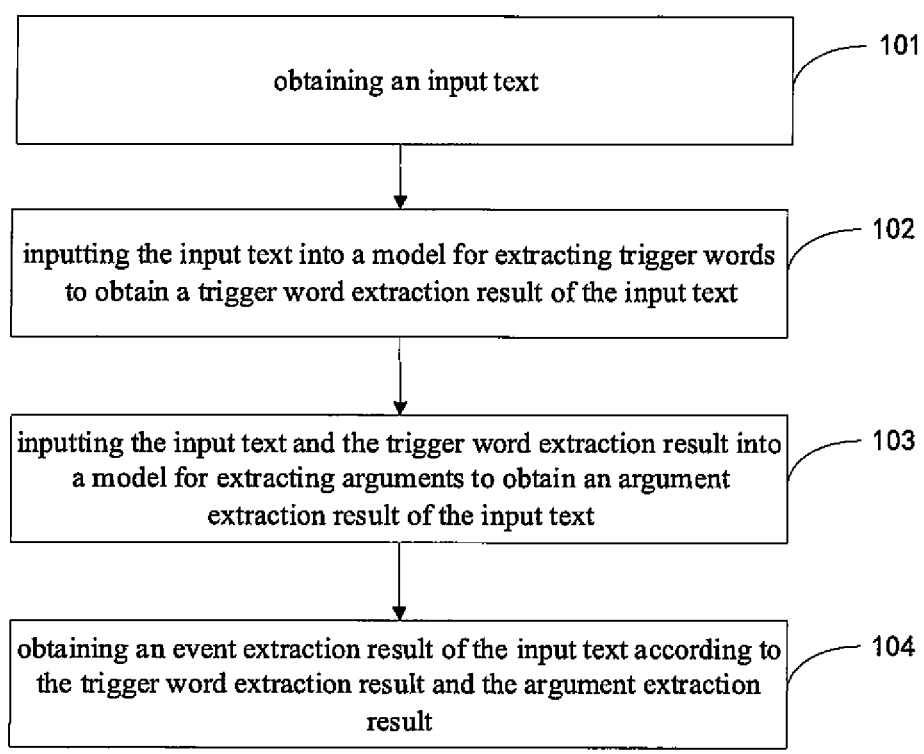
FIG. 1 is a flowchart of a method for extracting an event from a text according to Embodiment 1 of the disclosure.

FIG. 1 is a flowchart of a method for extracting an event from a text according to Embodiment 1 of the disclosure.

As illustrated in FIG. 1, the method for extracting the event from the text includes actions in the following blocks.

At block 101, an input text is obtained.

It should be noted that an execution subject of the method is the apparatus for extracting the event from the text, which is implemented by software and/or hardware. The apparatus may be configured in an electronic device. The electronic device in the embodiments may include a terminal device and a server, which is not limited in the embodiments.

The input text in the embodiments may be in Chinese, English, or other languages. The embodiments do not specifically limit the language type of the input text. It should be noted that the embodiments take the input text in Chinese as an example for description.

The input text in the embodiments refers to the text to be prepared for event extraction. The input text may be a text in any field. For example, the input text could be "MoMo Company has established a research center in Hangzhou", or "Grand Canyon declared bankruptcy today", which is not specifically limited in the embodiments.

At block 102, the input text is input into a model for extracting trigger words to obtain a trigger word extraction result of the input text.

In the embodiments, after the input text is input to the model for extracting trigger words, the model performs contextual feature and semantic analysis on characters in the input text, and the trigger word extraction result is extracted from the input text according to an analysis result of the input text.

It should be understood that, the model for extracting trigger words in the embodiments may be obtained in advance based on training data. As a possible implementation, the process of training the model for extracting trigger words is to obtain the training data firstly. The training data includes sample texts and the trigger word labeling results of the sample texts. According to the sample texts and the trigger word labeling results of the sample texts, an original model for extracting trigger words is trained to obtain the model for extracting trigger words.

The model for extracting trigger words in the embodiments may include an input layer, a network layer, a labeling layer, and an output layer. A network in the network layer in the embodiments may be a deep neural network. The labeling layer in the embodiments may include a conditional random field (CRF) network.

At block 103, the input text and the trigger word extraction result are input into a model for extracting arguments to obtain an argument extraction result of the input text.

It should be understood that the model for extracting arguments in the embodiments is pre-trained. As a possible implementation, the model for extracting arguments is trained by obtaining the training data firstly. The training data includes the sample texts, trigger word labeling results of the sample texts, and argument labeling results of the sample texts. The sample texts and the trigger word labeling results of the sample texts are determined as input of the original model for extracting arguments to train the original model for extracting arguments, to obtain the model for extracting arguments.

In the embodiments, after the input text and the trigger word extraction result are input into the model for extracting arguments, as a possible implementation within the model for extracting arguments, the input text is segmented to obtain a character sequence of the input text, a text embedding sequence corresponding to the character sequence is determined according to the character sequence, and a trigger word embedding sequence of the character sequence is determined according to the trigger word extraction result. A fusion embedding sequence is determined by summing the text embedding sequence and the trigger word embedding sequence, and then the network layer in the model for extracting arguments determines the semantic embedding sequence of the character sequence based on the fusion embedding sequence. Finally, the labeling network in the model for extracting arguments determines the labeling result of the character sequence according to the semantic embedding sequence, and determines the trigger word extraction result of the input text according to the labeling result of the character sequence.

At block 104, an event extraction result of the input text is determined according to the trigger word extraction result and the argument extraction result.

It is understood that, compared to methods of extracting events based on artificially constructed features (such as artificially constructed rules and templates) when performing event extraction from a text in related art, in the embodiments, the event extraction of the input text is realized by using the model for extracting trigger words and the model for extracting arguments, which not only effectively improves performance of the event extraction, but also reduces construction cost of the event extraction without any artificial feature construction.

In the method for extracting the event from the text according to the embodiments of the disclosure, when performing the event extraction on the input text, the input text is input into the model for extracting trigger words to obtain the trigger word extraction result of the input text. The input text and the trigger word extraction result are input into the model for extracting arguments to obtain the argument extraction result of the input text. The event extraction result of the input text is obtained according to the trigger word extraction result and the argument extraction result. Therefore, the event extraction of the input text is realized by using the model for extracting trigger words and the model for extracting arguments, the accuracy of the event extraction of the input text is improved, and the construction cost of the event extraction is reduced without any artificial features.

It is understandable that there are many application scenarios for the event extraction method of the embodiments. For example, the event extraction of the embodiments is applicable to scenarios in the financial field. By extracting company events, effective risk control is performed.

The application scenarios of the embodiments do not limit the two application scenarios mentioned above, and the application scenarios of the event extraction in the embodiments are not limited.

Figure 2:
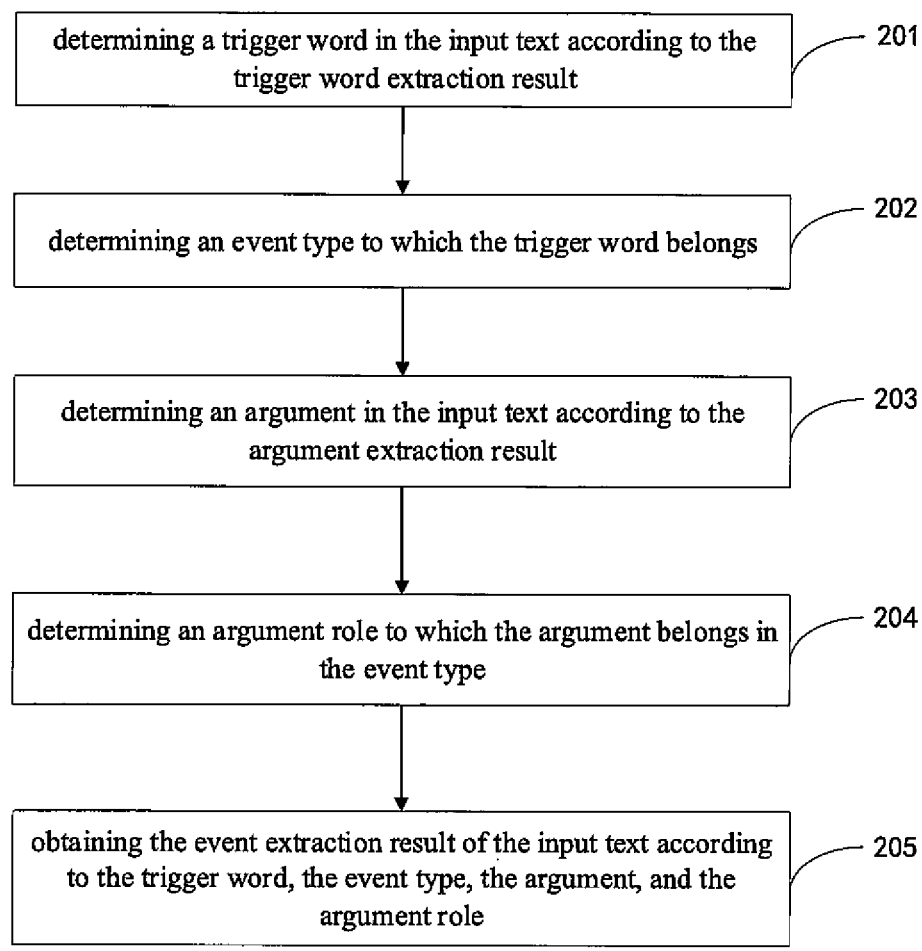
FIG. 2 is a flowchart of a method for extracting an event from a text according to Embodiment 2 of the disclosure.

In embodiments of the disclosure, in order to accurately determine the event extraction result of the input text, as shown in FIG. 2, in the embodiments, obtaining the event extraction result of the input text according to the trigger word extraction result and the argument extraction result includes actions in the following blocks.

At block 201, a trigger word in the input text is determined according to the trigger word extraction result.

The trigger word extraction result in the embodiments may include trigger word recognition results of each character. Correspondingly, the trigger word recognition results of each character are used to determine the trigger word in the input text.

For example, the input text is "张三三求婚杨依依 (Chinese text, which means that Zhang Sansan makes a marriage proposal to Yang Yiyi)". It is assumed that both 张三三 (Chinese name, which is spelled as Zhang Sansan) and 杨依依 (Chinese name, which is spelled as Yang Yiyi) are public figures. According to the trigger word extraction result, it is determined that "求 (Chinese character, which means proposal)" is the beginning of the trigger word in the input text and "婚 (Chinese character, which means marriage)" is recognized as the middle word of the trigger word. According to the trigger word extraction result, "求婚 (Chinese characters, which mean making a marriage proposal)" is determined as the trigger word of the input text.

At block 202, an event type to which the trigger word belongs is determined.

In detail, the event type to which the trigger word belongs is determined according to a correspondence between each sample trigger word and the corresponding event type stored in advance.

It is understood that there may be one or more trigger word of the input text in the embodiments.

In some embodiments, a plurality of trigger words in the embodiments may correspond to the same event type, or each trigger word corresponds to one event type, which is not specifically limited in the embodiments. For example, if there are two trigger words of the input text, i.e., "car accident" and "rear-end", it is determined that the event type corresponding to the two trigger words is "traffic accident" according to the corresponding relation between the trigger word and the event type. For example, if there are two trigger words of the input text, trigger word 1 is "breaking news" and trigger word 2 is "divorce", it is determined that the event type corresponding to the trigger word 1 is a news event, and the event type corresponding to the trigger word 2 is a divorce event.

For another example, the input text is "张三三求婚杨依依 (Chinese text, which means that Zhang Sansan makes a marriage proposal to Yang Yiyi)". It is assumed that both 张三三 (Chinese name, which is spelled as Zhang Sansan) and 杨依依 (Chinese name, which is spelled as Yang Yiyi) are public figures. According to the trigger word extraction result, it is determined "杨依依 (Chinese characters, which mean making a marriage proposal)" as the trigger word in the input text. The event type to which the trigger word belongs is a "marriage proposal event".

At block 203, an argument in the input text is determined according to the argument extraction result.

For example, if the input text is "张三三求婚杨依依 (Chinese text, which means that Zhang Sansan makes a marriage proposal to Yang Yiyi)", and it is assumed that both 张三三 (Chinese name, which is spelled as Zhang Sansan) and 杨依依 (Chinese name, which is spelled as Yang Yiyi) are public figures, the argument extraction result may include argument recognition results of each character, and according to the argument recognition result, it is determined whether the character is an argument or not. According to the argument extraction result, it is determined that the arguments in the input text are "张三三" and "杨依依".

At block 204, an argument role to which the argument belongs in the event type is determined.

Referring to the above example, the event type of the input text is a "marriage proposal event", the argument role to which the argument "张三三" belongs in the "marriage proposal event" is determined as the suitor, and the argument role of the argument "杨依依" is determined to be a proposal receiver in the "marriage proposal event".

At block 205, the event extraction result of the input text is obtained according to the trigger word, the event type, the argument and the argument role.

In the embodiments, after obtaining the trigger word, the event type, the argument, and the argument role, a complete event structure is obtained according to the trigger word, the event type, the argument, and the argument role, so that the event extraction result of the input text could be accurately determined and then the event extraction result of the input text could be accurately output.

Figure 3:
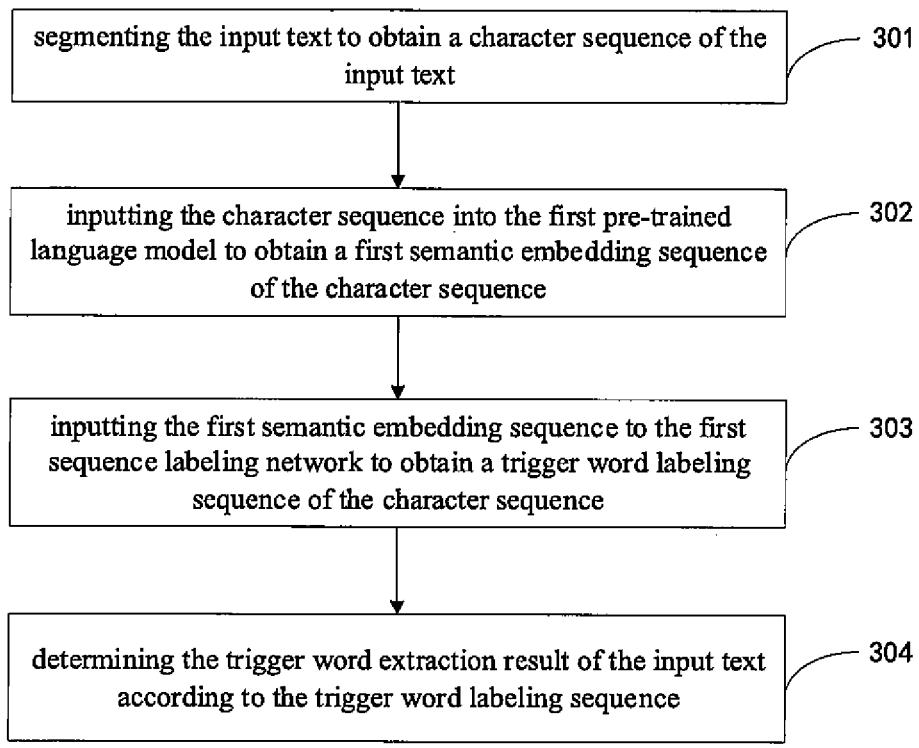
FIG. 3 is a flowchart of a method for extracting an event from a text according to Embodiment 3 of the disclosure.

In embodiments of the disclosure, in order to accurately extract trigger words from the input text, the model for extracting trigger words in the embodiments may include a first pre-trained language model and a first sequence labeling network. As shown in FIG. 3, the action in the block 102 in the embodiments may include actions in the following blocks.

At block 301, the input text is segmented to obtain a character sequence of the input text.

At block 302, the character sequence is input into the first pre-trained language model to obtain a first semantic embedding sequence of the character sequence.

In detail, the text embedding sequence of the character sequence may be input into the first pre-trained language model to obtain the first semantic embedding sequence of the character sequence.

The text embedding in the embodiments may include character embedding, position embedding, and context embedding of the character sequence.

In detail, a character embedding sequence, a position embedding sequence, and a context embedding sequence of the character sequence are summed up to obtain the fusion embedding sequence of the character sequence, and the fusion embedding sequence is input into the first pre-trained language model to obtain the first semantic embedding sequence of the character sequence.

The first pre-trained language model in the implementations and a second pre-trained language model in the following embodiments are Bidirectional Encoder Representations from Transformers (BERT), or Enhanced Representation from kNowledge IntEgration (ERNIE), which is not specifically limited in the embodiments.

At block 303, the first semantic embedding sequence is input into the first sequence labeling network to obtain a trigger word labeling sequence of the character sequence.

At block 304, the trigger word extraction result of the input text is determined according to the trigger word labeling sequence.

The labeling mode in the embodiments may be any type of labeling mode. For example, the labeling mode is BIO mode. BIO mode labels every character in the text. B-type indicates that the current character is the first character of the trigger word, and the event type triggered by the trigger word is type; I-type indicating that the current character is in the trigger word, and the event type triggered by the trigger word is type; O indicating the current character is not in any trigger word. For example, if the text "张三三求婚杨依依" is input, the corresponding trigger word labeling sequence is 张/O, 三/O, 三/O, 求/B, 婚/I, 杨/O, 依/O, 依/O, and according to the trigger word labeling sequence, "求婚" in the input text is determined as the trigger word of the input text.

In the embodiments, the character sequence is input into the first pre-trained language model to obtain the semantic embedding sequence of the character sequence, and the semantic embedding sequence is accurately labeled by the sequence labeling network to obtain the trigger word labeling sequence of the character sequence, and the trigger word extraction result of the input text is accurately determined according to the trigger word labeling sequence.

Figure 4:
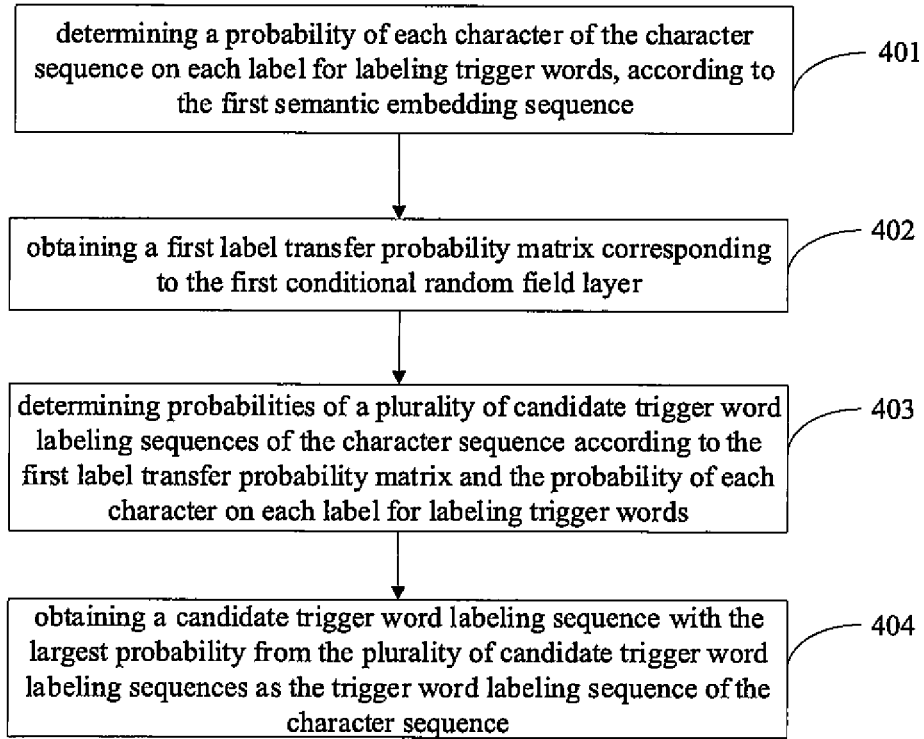
FIG. 4 is a flowchart of a method for extracting an event from a text according to Embodiment 4 of the disclosure.

In embodiments of the disclosure, in order to further improve the accuracy of the extracted trigger words, the first sequence labeling network in embodiments may include a first conditional random field layer. As shown in FIG. 4, the action in the above block 303 may include the following.

At block 401, a probability of each character of the character sequence on each label for labeling trigger words is determined according to the first semantic embedding sequence.

At block 402, a first label transfer probability matrix corresponding to the first conditional random field layer is obtained.

The first label transfer probability matrix includes a probability that a label for labeling trigger words is transferred to another label for labeling trigger words.

At block 403, probabilities of a plurality of candidate trigger word labeling sequences of the character sequence are determined according to the first label transfer probability matrix and the probability of each character on each label for labeling trigger words.

At block 404, a candidate trigger word labeling sequence with the largest probability is obtained from the plurality of candidate trigger word labeling sequences as the trigger word labeling sequence of the character sequence.

In embodiments of the disclosure, in order to improve the accuracy of extracting arguments from the input text, the model for extracting arguments in the embodiments may include a second pre-trained language model and a second sequence labeling network. In detail, according to the semantic embedding sequence output by the second pre-trained language model, the semantic embedding sequence is labeled by the second sequence labeling network, to accurately determine the arguments of the input text according to the labeling result. A possible implementation of the block 103 is described below with reference to FIG. 5.

Figure 5:
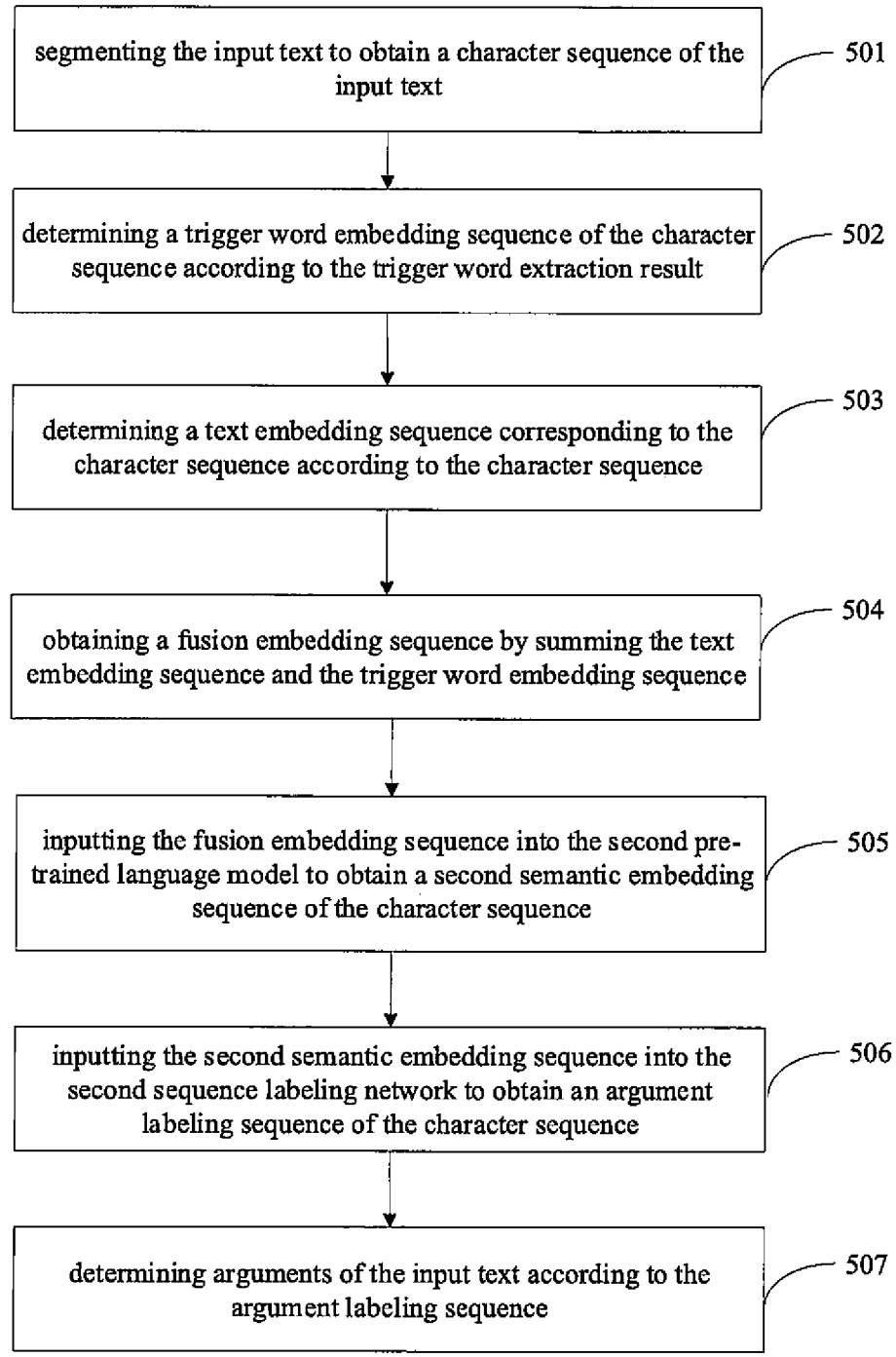
FIG. 5 is a flowchart of a method for extracting an event from a text according to Embodiment 5 of the disclosure.

As illustrated in FIG. 5, the action in the block 103 includes the following.

At block 501, the input text is segmented to obtain a character sequence of the input text.

At block 502, a trigger word embedding sequence of the character sequence is determined according to the trigger word extraction result.

In the embodiments, the trigger word extraction result includes the trigger word recognition result of each character in the input text. According to the trigger word extraction result, as a possible implementation, determining the trigger word embedding sequence of the character sequence may be: determining a trigger word embedding sequence of the character sequence according to the trigger word extraction result of each character. Therefore, the trigger word embedding sequence of the character sequence is accurately obtained.

In detail, for each character in the character sequence, the trigger word embedding corresponding to the character is determined according to the trigger word recognition result of the character, and the trigger word embedding sequence of the character sequence is generated according to the trigger word embedding of each character.

At block 503, a text embedding sequence corresponding to the character sequence is determined according to the character sequence.

At block 504, a fusion embedding sequence is obtained by summing the text embedding sequence and the trigger word embedding sequence.

The text embedding in the embodiments may include the character embedding, the position embedding, and the context embedding of the character sequence.

In detail, the character embedding sequence, the position embedding sequence, the context embedding sequence, and the trigger word embedding sequence of the character sequence are summed up to obtain the fusion embedding sequence of the character sequence.

At block 505, the fusion embedding sequence is input into the second pre-trained language model to obtain a second semantic embedding sequence of the character sequence.

For example, the fusion embedding sequence of the character sequence may be input into a second ERNIE model to obtain the second semantic embedding sequence of the character sequence.

At block 506, the second semantic embedding sequence is input into the second sequence labeling network to obtain an argument labeling sequence of the character sequence.

At block 507, arguments of the input text are determined according to the argument labeling sequence.

For example, the input text is "张三三求婚杨依依", it is assumed that the trigger word is "求婚", and the corresponding argument labeling sequence is 张/B, 三/I, 三/I, 求/O, 婚/O, 杨 /B, 依/I, 依/I. B means that the current character is the first character of the argument. I means that the current character is in the argument. O means the current character is not in any argument. According to the argument labeling sequence, it is determined that "张三三" and "杨依依" in the input text are the arguments in the input text.

In the embodiments, the character sequence and the trigger word extraction result are input into the second pre-trained language model to obtain the semantic embedding sequence of the character sequence, and arguments of the semantic embedding sequence are accurately labeled by the second sequence labeling network to obtain the argument labeling sequence of the character sequence, and the arguments of the input text are accurately determined according to the argument labeling results.

Figure 6:
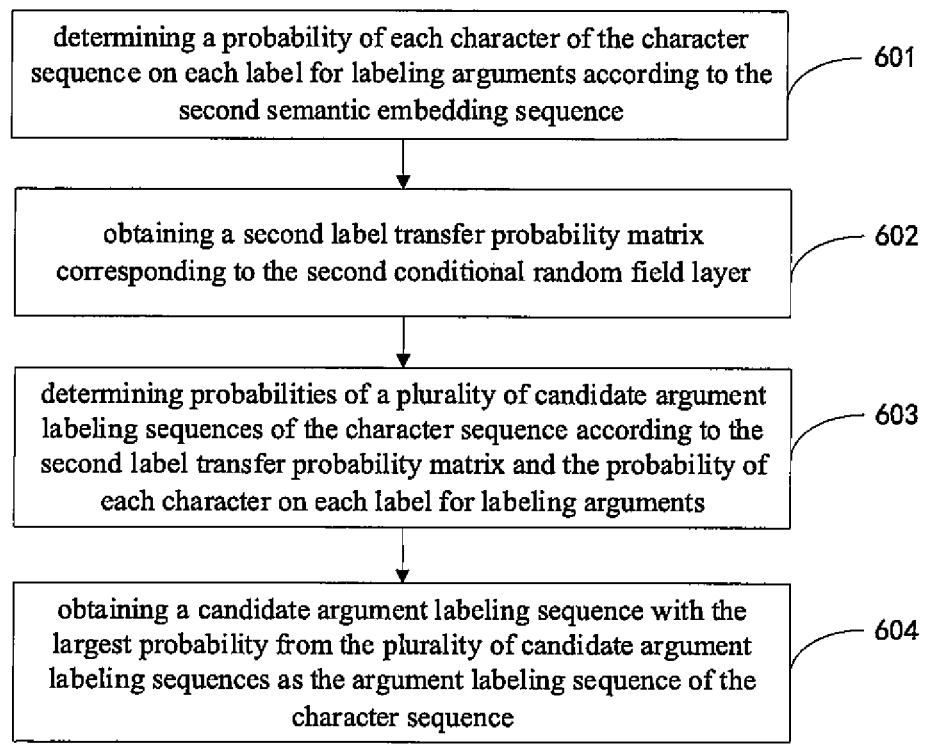
FIG. 6 is a flowchart of a method for extracting an event from a text according to Embodiment 6 of the disclosure.

In embodiments of the disclosure, in order to further improve the accuracy of the extracted arguments, the second sequence labeling network in the embodiments may include a second conditional random field layer. The above action in the block 507, as shown in FIG. 6, may include the following.

At block 601, a probability of each character of the character sequence on each label for labeling arguments is determined according to the second semantic embedding sequence.

At block 602, a second label transfer probability matrix corresponding to the second conditional random field layer is obtained.

The second label transfer probability matrix includes the probability of transferring an argument label to another argument label. For example, the BIO model is used as a label for labeling arguments, the second label transfer probability matrix includes the transfer probabilities among B label, I label, and O label.

At block 603, probabilities of a plurality of candidate argument labeling sequences of the character sequence are determined according to the second label transfer probability matrix and the probability of each character on each label for labeling arguments At block 604, a candidate argument labeling sequence with the largest probability is obtained from the plurality of candidate labeling argument sequences as the argument labeling sequence of the character sequence.

In order to enable those skilled in the art to clearly understand the disclosure, the method for extracting the event from the text in the embodiments may be described below with reference to FIG. 7.

Figure 7:
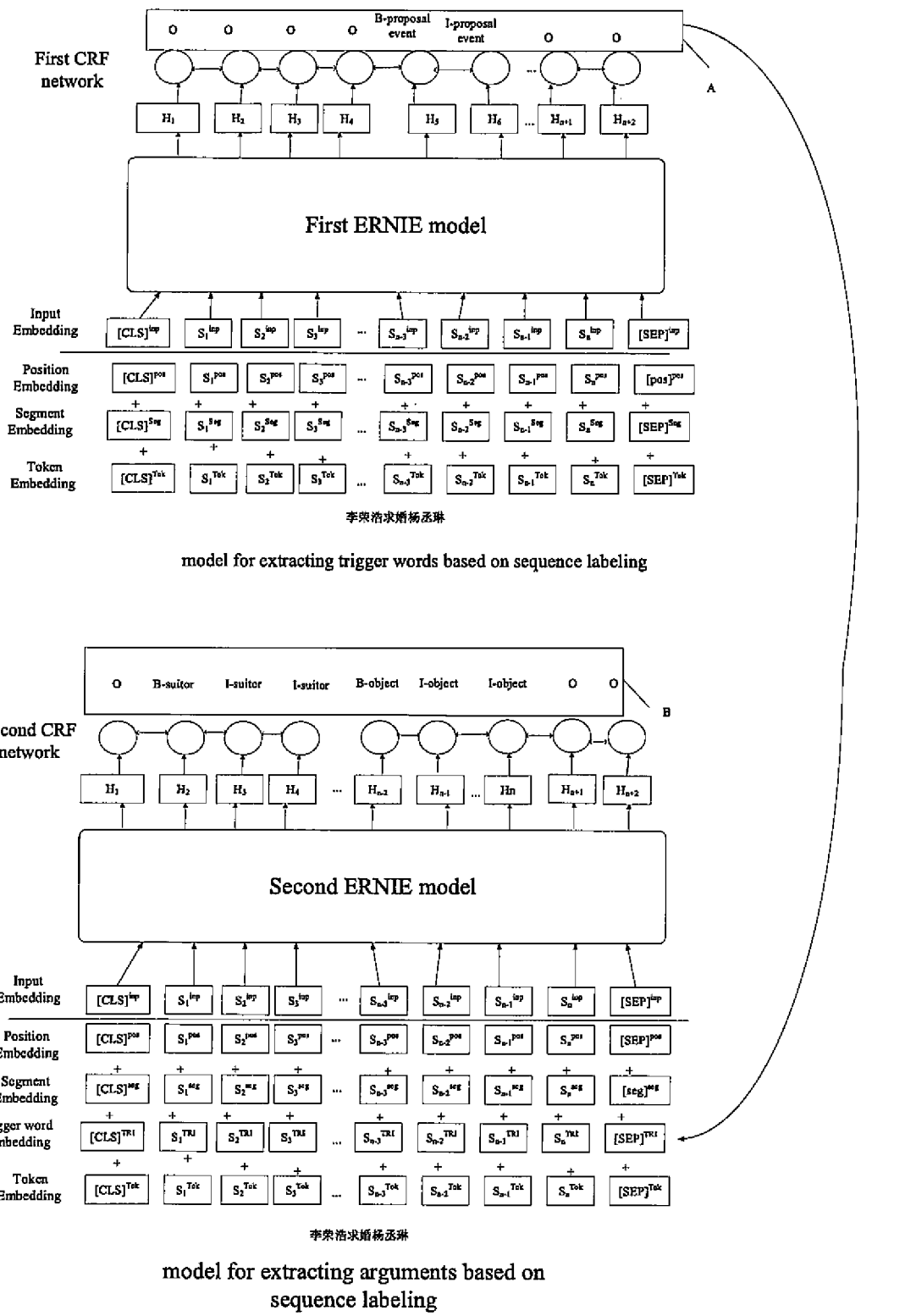
FIG. 7 is a flowchart of a method for extracting an event from a text according to Embodiment 7 of the disclosure.

In FIG. 7, it is taken the first pre-trained language model and the second pre-trained language model as ERNIE models for description, and the input text is "李荣浩求婚杨丞琳" (Chinese text, which means that Li Ronghao proposes to Rainie Yang)" as an example for description.

When inputting the input text into the model for extracting trigger words based on sequence labeling, correspondingly, an exemplary implementation process of the model for extracting trigger words based on sequence labeling is provided as follows.

Firstly, the input layer of the model for extracting trigger words constructs Token Embedding, Segment Embedding and Position Embedding of the input text, and the Token Embedding, Segment Embedding and Position Embedding are summed up and processed to obtain the fusion embedding.

Secondly, the fusion embedding is input into a first ERNIE model to obtain a pre-trained output layer vector.

Thirdly, the first ERNIE model is input into a first CRF network to obtain the trigger word labeling sequence.

The portion labeled A in FIG. 7 is the trigger word labeling result corresponding to the input text "李荣浩求婚杨丞琳".

Finally, according to the trigger word labeling sequence, it is determined that the trigger word in the input text is "求婚".

For the model for extracting arguments based on sequence labeling, firstly, a sentence input model may construct features including the Token Embedding, the Segment Embedding, the Position Embedding and trigger word Embedding, and predicted trigger words obtained by the model for extracting trigger word based on sequence labeling are added as Embedding. If the character at the changed position is recognized as a trigger word then the character is labeled 1, otherwise, the character is labeled 0 in the form of embedding.

Secondly, the above four types of Embeddings are summed up and processed to obtain a fusion embedding, and the fusion embedding is input into the second ERNIE model to calculate the pre-trained output layer vector.

Thirdly, the output layer vector of the second ERNIE model is input into the second CRF network to obtain the argument labeling result.

Finally, the arguments of the input text are determined according to the argument labeling result.

Referring to FIG. 7, the labeling modes used in the model for extracting trigger words and the model for extracting arguments in the embodiments are all labeling modes in the BIO format.

In the embodiments, the portion labeled B in FIG. 7 is the argument labeling result corresponding to the input text "李荣浩求婚杨丞琳". According to the argument labeling result, it is determined that the arguments of the input text "李荣浩求婚杨丞琳" are "李荣浩" and "杨丞琳".

The results of the model for extracting trigger words based on sequence labeling and the model for extracting arguments based on sequence labeling are correlated according to event structure schema, and the event extraction result of the input text is output.

In detail, based on the trigger word, the event type to which the trigger word belongs is determined as the "proposal event", the argument role of the argument "李荣浩 (Chinese name, which is spelled as Li Ronghao)" in the proposal event is a "suitor", and correspondingly, it is determined that the argument role of the argument "(Chinese name, which is spelled as Rainlin Yang)" in the proposal event is "proposal receiver" or "proposal object".

In the method for extracting the event from the text according to the embodiments of the disclosure, trigger word extraction is performed on the input text through the model for extracting trigger words based on sequence labeling to obtain the trigger word extraction result of the input text, and the input text and the trigger word extraction result are input into the model for extracting arguments based on sequence labeling to obtain the argument extraction result of the input text. Correspondingly, based on the argument extraction result and the trigger word extraction result, the event extraction result of the input text is obtained based on result correlation of the event structure. Therefore, event extraction based entirely on deep learning is realized, the accuracy of the event extraction of the input text is improved, and the construction cost of the event extraction is reduced without any artificial features.

In order to implement the foregoing embodiments, embodiments of the disclosure also provide an apparatus for extracting an event from a text.

Figure 8:
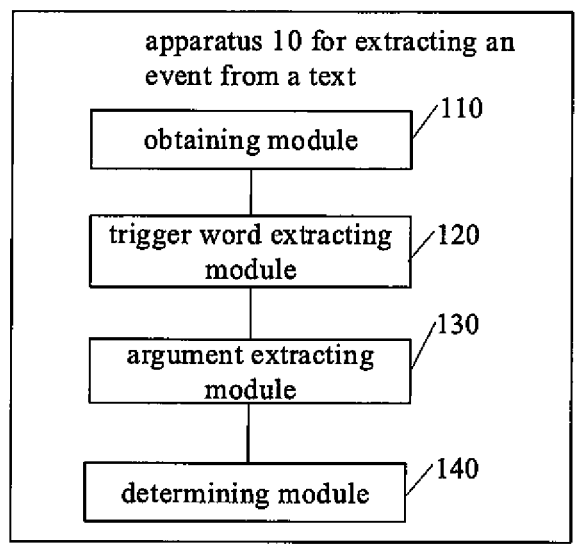
FIG. 8 is a block diagram of an apparatus for extracting an event from a text according to Embodiment 8 of the disclosure.

FIG. 8 is a schematic diagram of an apparatus for extracting an event from a text according to Embodiment 8 of the disclosure.

As illustrated in FIG. 8, the apparatus 10 for extracting an event from a text, includes: an obtaining module 110, a trigger word extracting module 120, an argument extracting module 130 and a determining module 140.

The obtaining module 110 is configured to obtain an input text.

The trigger word extracting module 120 is configured to input the input text into a model for extracting trigger words to obtain a trigger word extraction result of the input text.

The argument extracting module 130 is configured to input the input text and the trigger word extraction result into a model for extracting arguments to obtain an argument extraction result of the input text.

The determining module 140 is configured to obtain an event extraction result of the input text according to the trigger word extraction result and the argument extraction result.

It should be noted that the foregoing explanation of the embodiments of the method for extracting the event from the text is also applicable to the apparatus for extracting the event from the text in this embodiment, which is not repeated herein.

With the apparatus for extracting the event from the text according to the embodiments of the disclosure, when performing the event extraction on the input text, the input text is input into the model for extracting trigger words to obtain the trigger word extraction result of the input text. The input text and the trigger word extraction result are input into the model for extracting arguments to obtain the argument extraction result of the input text. The event extraction result of the input text is obtained according to the trigger word extraction result and the argument extraction result. Therefore, the event extraction of the input text is realized by using the model for extracting trigger words and the model for extracting arguments, the accuracy of the event extraction of the input text is improved, and the construction cost of the event extraction is reduced without any artificial features.

Figure 9:
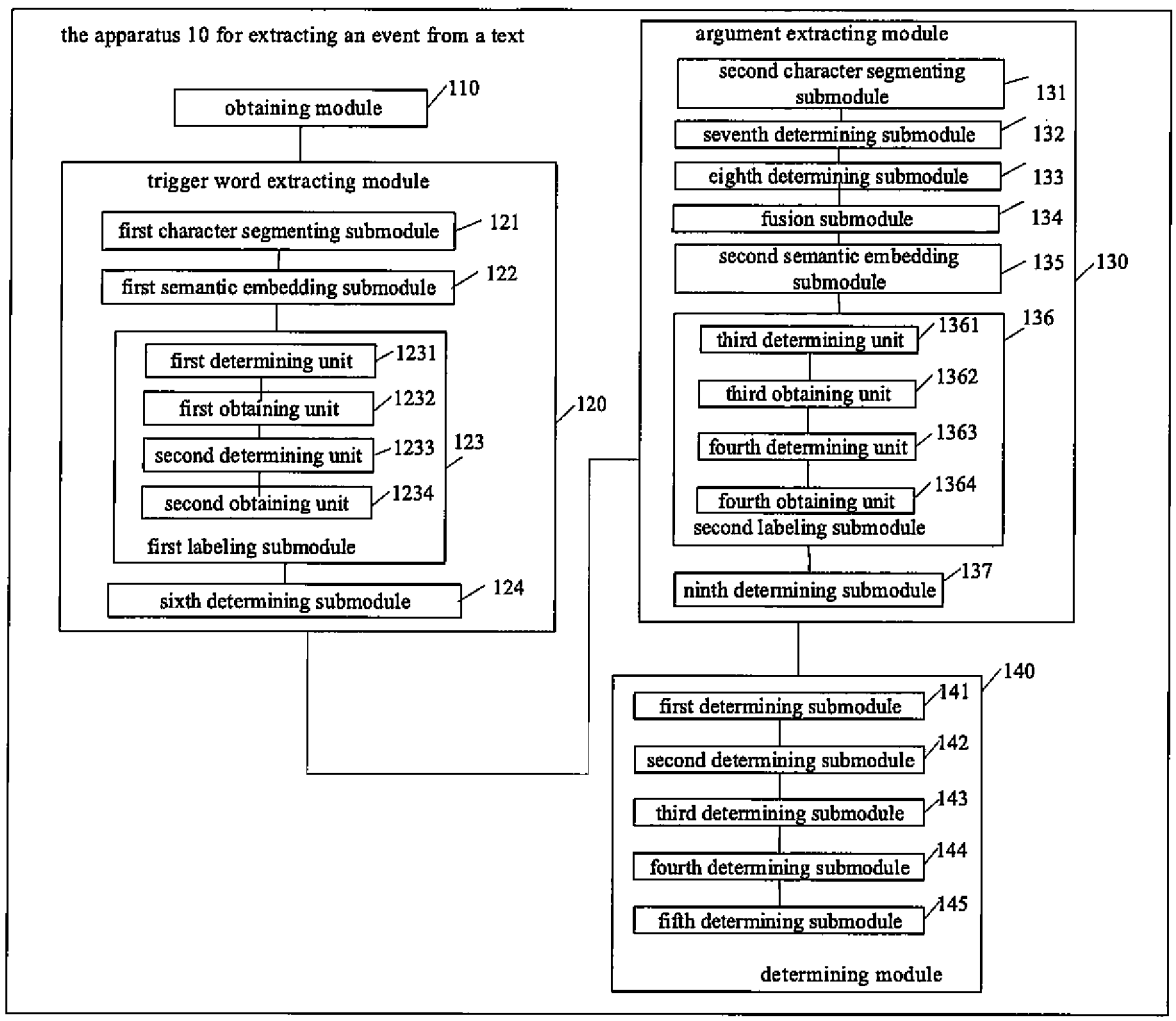
FIG. 9 is a block diagram of an apparatus for extracting an event from a text according to Embodiment 9 of the disclosure.

In embodiments of the disclosure, on the basis of the apparatus embodiment shown in FIG. 8, as shown in FIG. 9, the determining module 140 may include: a first determining submodule 141, a second determining submodule 142, a third determining submodule 143, a fourth determining submodule 144 and a fifth determining submodule 145.

The first determining submodule 141 is configured to determine a trigger word in the input text according to the trigger word extraction result.

The second determining submodule 142 is configured to determine an event type to which the trigger word belongs.

The third determining submodule 143 is configured to determine an argument in the input text according to the argument extraction result.

The fourth determining submodule 144 is configured to determine an argument role to which the argument belongs in the event type.

The fifth determining submodule 145 is configured to obtain the event extraction result of the input text according to the trigger word, the event type, the argument and the argument role.

In embodiments of the disclosure, the model for extracting trigger words includes a first pre-trained language model and a first sequence labeling network, and the trigger word extracting module 120 includes: a first character segmenting submodule 121, a first semantic embedding submodule 122, a first labeling submodule 123 and a sixth determining submodule 124.

The first character segmenting submodule 121 is configured to segment the input text to obtain a character sequence of the input text.

The first semantic embedding submodule 122 is configured to input the character sequence into the first pre-trained language model to obtain a first semantic embedding sequence of the character sequence.

The first labeling submodule 123 is configured to input the first semantic embedding sequence to the first sequence labeling network to obtain a trigger word labeling sequence of the character sequence.

The sixth determining submodule 124 is configured to determine the trigger word extraction result of the input text according to the trigger word labeling sequence.

In embodiments of the disclosure, the first sequence labeling network includes a first conditional random field layer, and the first labeling submodule 123 includes: a first determining unit 1231, a first obtaining unit 1232, a second determining unit 1233 and a second obtaining unit 1234.

The first determining unit 1231 is configured to determine a probability of each character of the character sequence on each label for labeling trigger words, according to the first semantic embedding sequence.

The first obtaining unit 1232 is configured to obtain a first label transfer probability matrix corresponding to the first conditional random field layer.

The second determining unit 1233 is configured to determine probabilities of a plurality of candidate trigger word labeling sequences of the character sequence according to the first label transfer probability matrix and the probability of each character on each label for labeling trigger words.

The second obtaining unit 1234 is configured to obtain a candidate trigger word labeling sequence with the largest probability from the plurality of candidate trigger word labeling sequences as the trigger word labeling sequence of the character sequence.

In embodiments of the disclosure, the model for extracting arguments includes a second pre-trained language model and a second sequence labeling network, and the argument extracting module 130 includes: a second character segmenting submodule 131, a seventh determining submodule 132, an eighth determining submodule 133, a fusion submodule 134, a second semantic embedding submodule 135, a second labeling submodule 136 and a ninth determining submodule 137.

The second character segmenting submodule 131 is configured to segment the input text to obtain a character sequence of the input text.

The seventh determining submodule 132 is configured to determine a trigger word embedding sequence of the character sequence according to the trigger word extraction result.

The eighth determining submodule 133 is configured to determine a text embedding sequence corresponding to the character sequence according to the character sequence.

The fusion submodule 134 is configured to obtain a fusion embedding sequence by summing the text embedding sequence and the trigger word embedding sequence.

The second semantic embedding submodule 135 is configured to input the fusion embedding sequence into the second pre-trained language model to obtain a second semantic embedding sequence of the character sequence.

The second labeling submodule 136 is configured to input the second semantic embedding sequence into the second sequence labeling network to obtain an argument labeling sequence of the character sequence.

The ninth determining submodule 137 is configured to determine arguments of the input text according to the argument labeling sequence.

In embodiments of the disclosure, the trigger word extraction result includes a trigger word recognition result of each character in the input text, and the seventh determining submodule 132 is further configured to determine the trigger word embedding sequence of the character sequence according to the trigger word recognition result of each character.

In detail, for each character in the character sequence, the seventh determining submodule 132 may determine the trigger word embedding corresponding to each character according to the trigger word recognition result of each character, and according to the trigger word embedding corresponding to each character, the trigger word embedding sequence of the character sequence is generated.

In embodiments of the disclosure, the second sequence labeling network includes a second conditional random field layer, and the second labeling submodule 136 includes: a third determining unit 1361, a third obtaining unit 1362, a fourth determining unit 1363 and a fourth obtaining unit 1364.

The third determining unit 1361 is configured to determine a probability of each character of the character sequence on each label for labeling arguments according to the second semantic embedding sequence.

The third obtaining unit 1362 is configured to obtain a second label transfer probability matrix corresponding to the second conditional random field layer.

The fourth determining unit 1363 is configured to determine probabilities of a plurality of candidate argument labeling sequences of the character sequence according to the second label transfer probability matrix and the probability of each character on each label for labeling arguments.

The fourth obtaining unit 1364 is configured to obtain a candidate argument labeling sequence with the largest probability from the plurality of candidate argument labeling sequences as the argument labeling sequence of the character sequence.

With the apparatus for extracting the event from the text according to the embodiments of the disclosure, when performing the event extraction on the input text, the input text is input into the model for extracting trigger words to obtain the trigger word extraction result of the input text. The input text and the trigger word extraction result are input into the model for extracting arguments to obtain the argument extraction result of the input text. The event extraction result of the input text is obtained according to the trigger word extraction result and the argument extraction result. Therefore, the event extraction of the input text is realized by using the model for extracting trigger words and the model for extracting arguments, the accuracy of the event extraction of the input text is improved, and the construction cost of the event extraction is reduced without any artificial features.

According to the embodiments of the disclosure, the disclosure also provides an electronic device and a readable storage medium.

Figure 10:
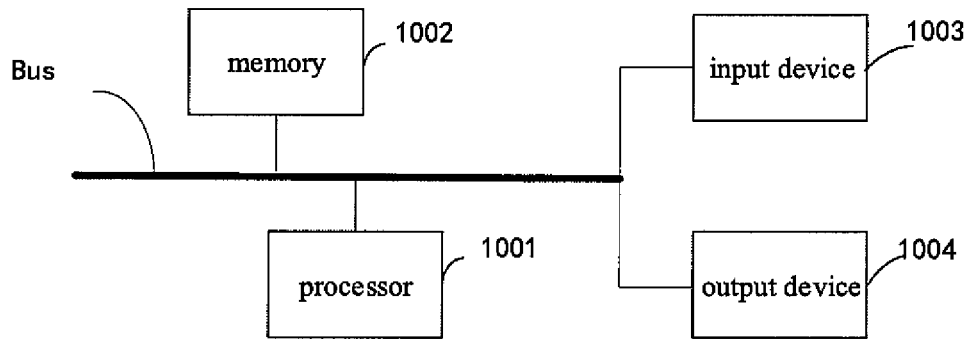
FIG. 10 is a block diagram of an electronic device for implementing a method for extracting an event from a text according to an embodiment of the disclosure.

FIG. 10 is a block diagram of an electronic device for implementing a method for extracting an event from a text according to an embodiment of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 10, the electronic device includes: one or more processors 1001, a memory 1002, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 1001 is taken as an example in FIG. 10.

The memory 1002 is a non-transitory computer-readable storage medium according to the disclosure. The memory stores instructions executable by at least one processor, so that the at least one processor executes the method for extracting an event from a text according to the disclosure. The non-transitory computer-readable storage medium of the disclosure stores computer instructions, which are used to cause a computer to execute the method for extracting the event from the text according to the disclosure.

As a non-transitory computer-readable storage medium, the memory 1002 is configured to store non-transitory software programs, non-transitory computer executable programs and modules, such as program instructions/modules corresponding to the method for extracting the event from the text in the embodiment of the disclosure (for example, the obtaining module 110, the trigger word extracting module 120, the argument extracting module 130 and the determining module 140 shown in FIG. 8). The processor 1001 executes various functional applications and data processing of the server by running non-transitory software programs, instructions, and modules stored in the memory 1002, that is, implementing the method for extracting the event from the text in the foregoing method embodiments.

The memory 1002 may include a storage program area and a storage data area, where the storage program area may store an operating system and application programs required for at least one function. The storage data area may store data created according to the use of the electronic device, and the like. In addition, the memory 1002 may include a high-speed random access memory, and a non-transitory memory, such as at least one magnetic disk storage device, a flash memory device, or other non-transitory solid-state storage device. In some embodiments, the memory 1002 may optionally include a memory remotely disposed with respect to the processor 1001, and these remote memories may be connected to the electronic device through a network. Examples of the above network include, but are not limited to, the Internet, an intranet, a local area network, a mobile communication network, and combinations thereof.

The electronic device for implementing the method for extracting the event from the text may further include: an input device 1003 and an output device 1004. The processor 1001, the memory 1002, the input device 1003, and the output device 1004 may be connected through a bus or in other manners. In FIG. 10, the connection through the bus is taken as an example.

The input device 1003 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 1004 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the method for extracting the event from the text according to the embodiments of the disclosure, when performing the event extraction on the input text, the input text is input into the model for extracting trigger words to obtain the trigger word extraction result of the input text.

The input text and the trigger word extraction result are input into the model for extracting arguments to obtain the argument extraction result of the input text. The event extraction result of the input text is obtained according to the trigger word extraction result and the argument extraction result. Therefore, the event extraction of the input text is realized by using the model for extracting trigger words and the model for extracting arguments, the accuracy of the event extraction of the input text is improved, and the construction cost of the event extraction is reduced without any artificial features.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for extracting an event from a text, comprising:
    obtaining an input text;
    inputting the input text into a model for extracting trigger words to obtain a trigger word extraction result of the input text;
    inputting the input text and the trigger word extraction result into a model for extracting arguments to obtain an argument extraction result of the input text; and
    obtaining an event extraction result of the input text according to the trigger word extraction result and the argument extraction result,
    wherein, the model for extracting trigger words comprises a first pre-trained language model and a first sequence labeling network, and the inputting the input text into the model for extracting trigger words to obtain the trigger word extraction result of the input text comprises:
    segmenting the input text to obtain a character sequence of the input text;
    inputting the character sequence into the first pre-trained language model to obtain a first semantic embedding sequence of the character sequence;
    inputting the first semantic embedding sequence to the first sequence labeling network to obtain a trigger word labeling sequence of the character sequence; and
    determining the trigger word extraction result of the input text according to the trigger word labeling sequence;
    wherein, the first sequence labeling network comprises a first conditional random field layer, and the inputting the first semantic embedding sequence to the first sequence labeling network to obtain the trigger word labeling sequence of the character sequence comprises:
    determining a probability of each character of the character sequence on each label for labeling trigger words, according to the first semantic embedding sequence;
    obtaining a first label transfer probability matrix corresponding to the first conditional random field layer;
    determining probabilities of a plurality of candidate trigger word labeling sequences of the character sequence according to the first label transfer probability matrix and the probability of each character on each label for labeling trigger words; and
    obtaining a candidate trigger word labeling sequence with the largest probability from the plurality of candidate trigger word labeling sequences as the trigger word labeling sequence of the character sequence.

2. The method according to claim 1, wherein the obtaining the event extraction result of the input text according to the trigger word extraction result and the argument extraction result, comprises:
    determining a trigger word in the input text according to the trigger word extraction result;
    determining an event type to which the trigger word belongs;
    determining an argument in the input text according to the argument extraction result;
    determining an argument role to which the argument belongs in the event type; and
    obtaining the event extraction result of the input text according to the trigger word, the event type, the argument, and the argument role.

3. The method according to claim 1, wherein,
the model for extracting arguments comprises a second pre-trained language model and a second sequence labeling network, and
the inputting the input text and the trigger word extraction result into the model for extracting arguments to obtain the argument extraction result of the input text comprises:
segmenting the input text to obtain a character sequence of the input text;
determining a trigger word embedding sequence of the character sequence according to the trigger word extraction result;
determining a text embedding sequence corresponding to the character sequence according to the character sequence;
obtaining a fusion embedding sequence by summing the text embedding sequence and the trigger word embedding sequence;
inputting the fusion embedding sequence into the second pre-trained language model to obtain a second semantic embedding sequence of the character sequence; and
inputting the second semantic embedding sequence into the second sequence labeling network to obtain an argument labeling sequence of the character sequence; and
determining arguments of the input text according to the argument labeling sequence.

4. The method according to claim 3, wherein,
the second sequence labeling network comprises a second conditional random field layer, and
the inputting the second semantic embedding sequence into the second sequence labeling network to obtain the argument labeling sequence of the character sequence comprises:
determining a probability of each character of the character sequence on each label for labeling arguments according to the second semantic embedding sequence;
obtaining a second label transfer probability matrix corresponding to the second conditional random field layer;
determining probabilities of a plurality of candidate argument labeling sequences of the character sequence according to the second label transfer probability matrix and the probability of each character on each label for labeling arguments; and
obtaining a candidate argument labeling sequence with the largest probability from the plurality of candidate argument labeling sequences as the argument labeling sequence of the character sequence.

5. The method according to claim 3, wherein
the trigger word extraction result comprises a trigger word recognition result of each character in the input text, and
the determining the trigger word embedding sequence of the character sequence according to the trigger word extraction result, comprises:
determining the trigger word embedding sequence of the character sequence according to the trigger word recognition result of each character.

6. An electronic device, comprising:
at least one processor; and
a memory communicatively connected to the at least one processor; wherein,
the memory stores instructions executable by the at least one processor, and when the instructions are executed by the at least one processor, the at least one processor is caused to implement a method for extracting an event from a text, the method comprising:
obtaining an input text;
inputting the input text into a model for extracting trigger words to obtain a trigger word extraction result of the input text;
inputting the input text and the trigger word extraction result into a model for extracting arguments to obtain an argument extraction result of the input text; and
obtaining an event extraction result of the input text according to the trigger word extraction result and the argument extraction result,
wherein, the model for extracting trigger words comprises a first pre-trained language model and a first sequence labeling network, and the inputting the input text into the model for extracting trigger words to obtain the trigger word extraction result of the input text comprises:
segmenting the input text to obtain a character sequence of the input text;
inputting the character sequence into the first pre-trained language model to obtain a first semantic embedding sequence of the character sequence;
inputting the first semantic embedding sequence to the first sequence labeling network to obtain a trigger word labeling sequence of the character sequence; and
determining the trigger word extraction result of the input text according to the trigger word labeling sequence;
wherein, the first sequence labeling network comprises a first conditional random field layer, and the inputting the first semantic embedding sequence to the first sequence labeling network to obtain the trigger word labeling sequence of the character sequence comprises:
determining a probability of each character of the character sequence on each label for labeling trigger words, according to the first semantic embedding sequence;
obtaining a first label transfer probability matrix corresponding to the first conditional random field layer;
determining probabilities of a plurality of candidate trigger word labeling sequences of the character sequence according to the first label transfer probability matrix and the probability of each character on each label for labeling trigger words; and
obtaining a candidate trigger word labeling sequence with the largest probability from the plurality of candidate trigger word labeling sequences as the trigger word labeling sequence of the character sequence.

7. The electronic device according to claim 6, wherein the obtaining the event extraction result of the input text according to the trigger word extraction result and the argument extraction result, comprises:
determining a trigger word in the input text according to the trigger word extraction result;
determining an event type to which the trigger word belongs;
determining an argument in the input text according to the argument extraction result;
determining an argument role to which the argument belongs in the event type; and
obtaining the event extraction result of the input text according to the trigger word, the event type, the argument, and the argument role.

8. The electronic device according to claim 6, wherein,
the model for extracting arguments comprises a second pre-trained language model and a second sequence labeling network, and the inputting the input text and the trigger word extraction result into the model for extracting arguments to obtain the argument extraction result of the input text comprises:
  segmenting the input text to obtain a character sequence of the input text;
  determining a trigger word embedding sequence of the character sequence according to the trigger word extraction result;
  determining a text embedding sequence corresponding to the character sequence according to the character sequence;
  obtaining a fusion embedding sequence by summing the text embedding sequence and the trigger word embedding sequence;
  inputting the fusion embedding sequence into the second pre-trained language model to obtain a second semantic embedding sequence of the character sequence; and
  inputting the second semantic embedding sequence into the second sequence labeling network to obtain an argument labeling sequence of the character sequence; and
  determining arguments of the input text according to the argument labeling sequence.

9. The electronic device according to claim 8, wherein,
the second sequence labeling network comprises a second conditional random field layer, and
the inputting the second semantic embedding sequence into the second sequence labeling network to obtain the argument labeling sequence of the character sequence comprises:
  determining a probability of each character of the character sequence on each label for labeling arguments according to the second semantic embedding sequence;
  obtaining a second label transfer probability matrix corresponding to the second conditional random field layer;
  determining probabilities of a plurality of candidate argument labeling sequences of the character sequence according to the second label transfer probability matrix and the probability of each character on each label for labeling arguments; and
  obtaining a candidate argument labeling sequence with the largest probability from the plurality of candidate argument labeling sequences as the argument labeling sequence of the character sequence.

10. The electronic device according to claim 8, wherein
the trigger word extraction result comprises a trigger word recognition result of each character in the input text, and
the determining the trigger word embedding sequence of the character sequence according to the trigger word extraction result, comprises:
  determining the trigger word embedding sequence of the character sequence according to the trigger word recognition result of each character.

11. A non-transitory computer-readable storage medium storing computer instructions, when the instructions are executed, the computer is caused to implement a method for extracting an event from a text, the method comprising:
  obtaining an input text;
  inputting the input text into a model for extracting trigger words to obtain a trigger word extraction result of the input text;
  inputting the input text and the trigger word extraction result into a model for extracting arguments to obtain an argument extraction result of the input text; and
  obtaining an event extraction result of the input text according to the trigger word extraction result and the argument extraction result,
wherein, the model for extracting trigger words comprises a first pre-trained language model and a first sequence labeling network, and the inputting the input text into the model for extracting trigger words to obtain the trigger word extraction result of the input text comprises:
  segmenting the input text to obtain a character sequence of the input text;
  inputting the character sequence into the first pre-trained language model to obtain a first semantic embedding sequence of the character sequence;
  inputting the first semantic embedding sequence to the first sequence labeling network to obtain a trigger word labeling sequence of the character sequence; and
  determining the trigger word extraction result of the input text according to the trigger word labeling sequence;
wherein, the first sequence labeling network comprises a first conditional random field layer, and the inputting the first semantic embedding sequence to the first sequence labeling network to obtain the trigger word labeling sequence of the character sequence comprises:
  determining a probability of each character of the character sequence on each label for labeling trigger words, according to the first semantic embedding sequence;
  obtaining a first label transfer probability matrix corresponding to the first conditional random field layer;
  determining probabilities of a plurality of candidate trigger word labeling sequences of the character sequence according to the first label transfer probability matrix and the probability of each character on each label for labeling trigger words; and
  obtaining a candidate trigger word labeling sequence with the largest probability from the plurality of candidate trigger word labeling sequences as the trigger word labeling sequence of the character sequence.

12. The non-transitory computer-readable storage medium according to claim 11, wherein the obtaining the event extraction result of the input text according to the trigger word extraction result and the argument extraction result, comprises:
  determining a trigger word in the input text according to the trigger word extraction result;
  determining an event type to which the trigger word belongs;
  determining an argument in the input text according to the argument extraction result;
  determining an argument role to which the argument belongs in the event type; and
  obtaining the event extraction result of the input text according to the trigger word, the event type, the argument, and the argument role.

13. The non-transitory computer-readable storage medium according to claim 11, wherein,
the model for extracting arguments comprises a second pre-trained language model and a second sequence labeling network, and
the inputting the input text and the trigger word extraction result into the model for extracting arguments to obtain the argument extraction result of the input text comprises:
  segmenting the input text to obtain a character sequence of the input text;

determining a trigger word embedding sequence of the character sequence according to the trigger word extraction result;

determining a text embedding sequence corresponding to the character sequence according to the character sequence;

obtaining a fusion embedding sequence by summing the text embedding sequence and the trigger word embedding sequence;

inputting the fusion embedding sequence into the second pre-trained language model to obtain a second semantic embedding sequence of the character sequence; and inputting the second semantic embedding sequence into the second sequence labeling network to obtain an argument labeling sequence of the character sequence; and determining arguments of the input text according to the argument labeling sequence.

14. The non-transitory computer-readable storage medium according to claim 13, wherein, the second sequence labeling network comprises a second conditional random field layer, and the inputting the second semantic embedding sequence into the second sequence labeling network to obtain the argument labeling sequence of the character sequence comprises:

determining a probability of each character of the character sequence on each label for labeling arguments according to the second semantic embedding sequence;

obtaining a second label transfer probability matrix corresponding to the second conditional random field layer;

determining probabilities of a plurality of candidate argument labeling sequences of the character sequence according to the second label transfer probability matrix and the probability of each character on each label for labeling arguments; and obtaining a candidate argument labeling sequence with the largest probability from the plurality of candidate argument labeling sequences as the argument labeling sequence of the character sequence.

* * * * *